United States Patent
Gatlin

(10) Patent No.: US 12,327,646 B1
(45) Date of Patent: Jun. 10, 2025

(54) SHIELDED LIFT AND TRANSPORT DEVICES FOR RADIOACTIVE PAYLOADS

(71) Applicant: Derek Gatlin, Hampden, ME (US)

(72) Inventor: Derek Gatlin, Hampden, ME (US)

( * ) Notice: Subject to any disclaimer, the term of this patent is extended or adjusted under 35 U.S.C. 154(b) by 89 days.

(21) Appl. No.: 18/533,084

(22) Filed: Dec. 7, 2023

(51) Int. Cl.
| | |
|---|---|
| *G21F 5/00* | (2006.01) |
| *G21F 5/015* | (2006.01) |
| *G21F 5/12* | (2006.01) |
| *G21F 5/14* | (2006.01) |

(52) U.S. Cl.
CPC ........... *G21F 5/015* (2013.01); *G21F 5/12* (2013.01); *G21F 5/14* (2013.01)

(58) Field of Classification Search
CPC ............ G21F 5/015; G21F 5/12; G21F 5/14
See application file for complete search history.

(56) References Cited

U.S. PATENT DOCUMENTS

| | | | |
|---|---|---|---|
| 3,655,981 A | 4/1972 | Montgomery et al. | |
| 6,431,751 B1 * | 8/2002 | Everett | A61B 6/4233 378/197 |
| 2006/0045229 A1 | 3/2006 | Balestracci | |
| 2009/0271068 A1 * | 10/2009 | Shi | G01V 5/20 701/36 |
| 2014/0226777 A1 | 8/2014 | Singh | |
| 2021/0012917 A1 | 1/2021 | Nunn | |
| 2025/0038703 A1 * | 1/2025 | Dobney | H02S 40/22 |

FOREIGN PATENT DOCUMENTS

| | | |
|---|---|---|
| AU | 2016100141 A4 | 3/2016 |
| CN | 107705866 A | 2/2018 |
| CN | 208559443 U | 3/2019 |
| CN | 213025420 U | 4/2021 |
| CN | 216833809 U | 6/2022 |
| GB | 2591527 A | 8/2021 |

OTHER PUBLICATIONS

International Search Report and Written Opinion issued corresponding International Patent Application No. PCT/US2024/058801, mailed Mar. 4, 2025, 8 pgs.
International Search Report and Written Opinion issued in related International Patent Application No. PCT/US2024/058791, mailed Feb. 10, 2025, 6 pgs.
CHT Sheilded Transport Trolley for Radiopharmaceutical Drug, Lemerpax Catalog Sheet, Updated Jun. 2022.

* cited by examiner

*Primary Examiner* — Nicole M Ippolito
(74) *Attorney, Agent, or Firm* — Verrill Dana, LLP; Robert L. Hover

(57) ABSTRACT

Provided herein are radioactive lift transport carts including a wheeled base having a platform, a shielding assembly on the platform and including a shield casing having an interior cavity, a first well positioned within the interior cavity and sized to receive a first radioactive payload, a second well positioned within the interior cavity and sized to receive a second radioactive payload, the shield casing extending around the first and second well casings to form one or more shielding cavities between the shield casing and the first and second well casings, radiation shielding material filling the one or more shielding cavities to surround the first and second well casings, a mast extending upward from the wheeled base, a boom extending outward from the mast to form a cantilever, and a lift repositionable along the boom to lift the radioactive payloads out of at least one of the first and second wells.

24 Claims, 9 Drawing Sheets

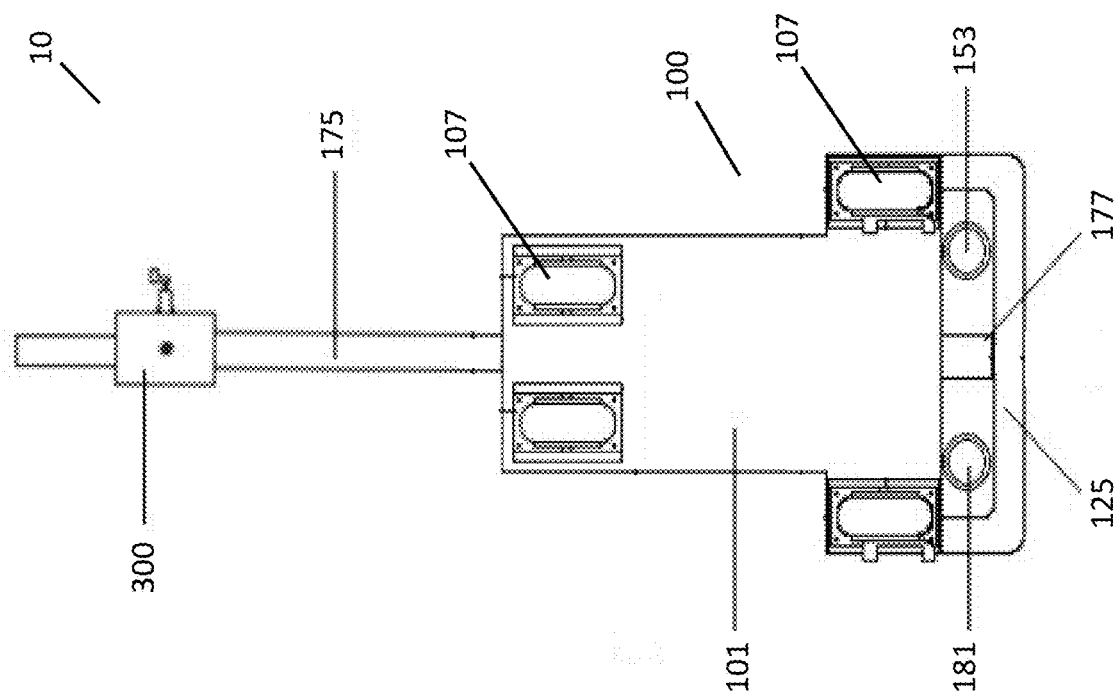
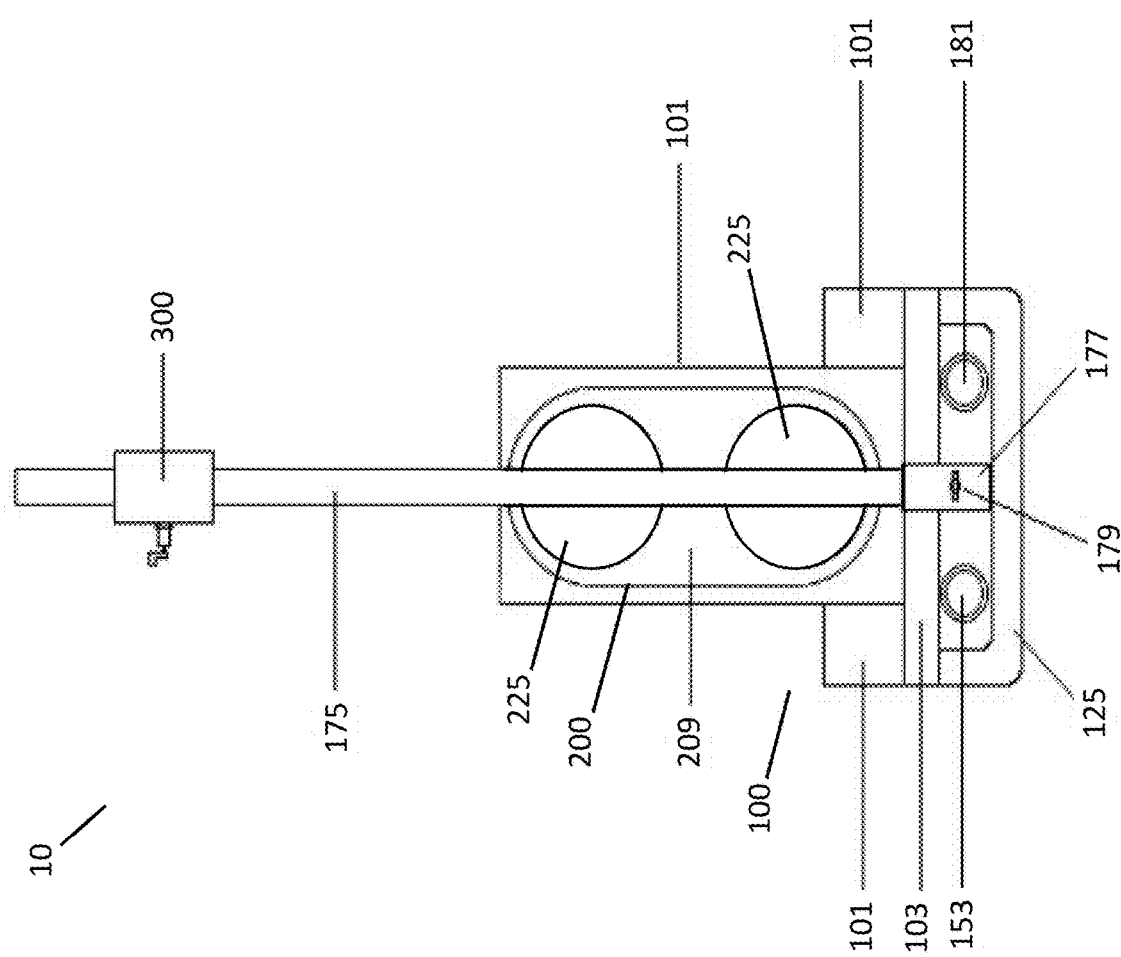

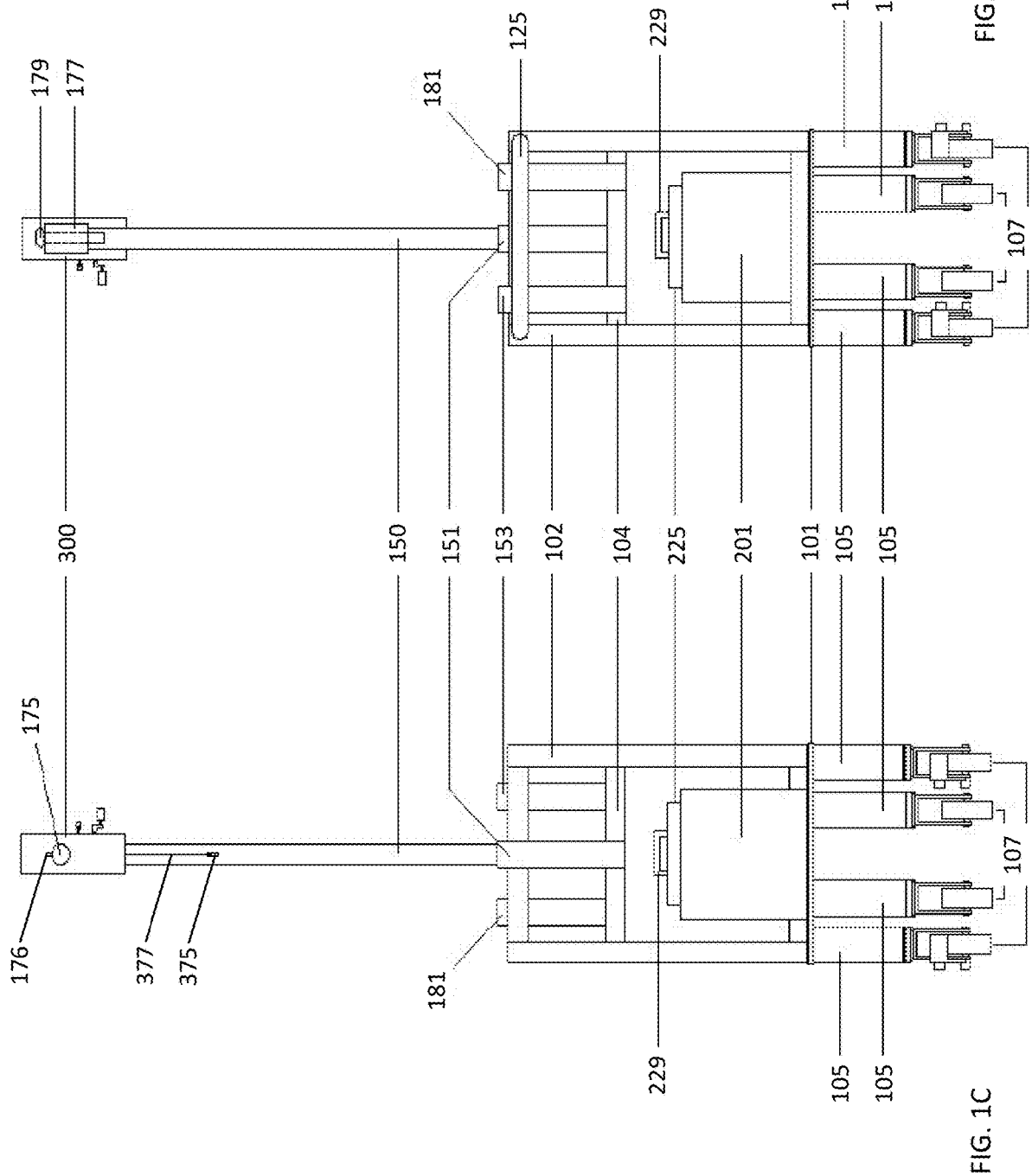

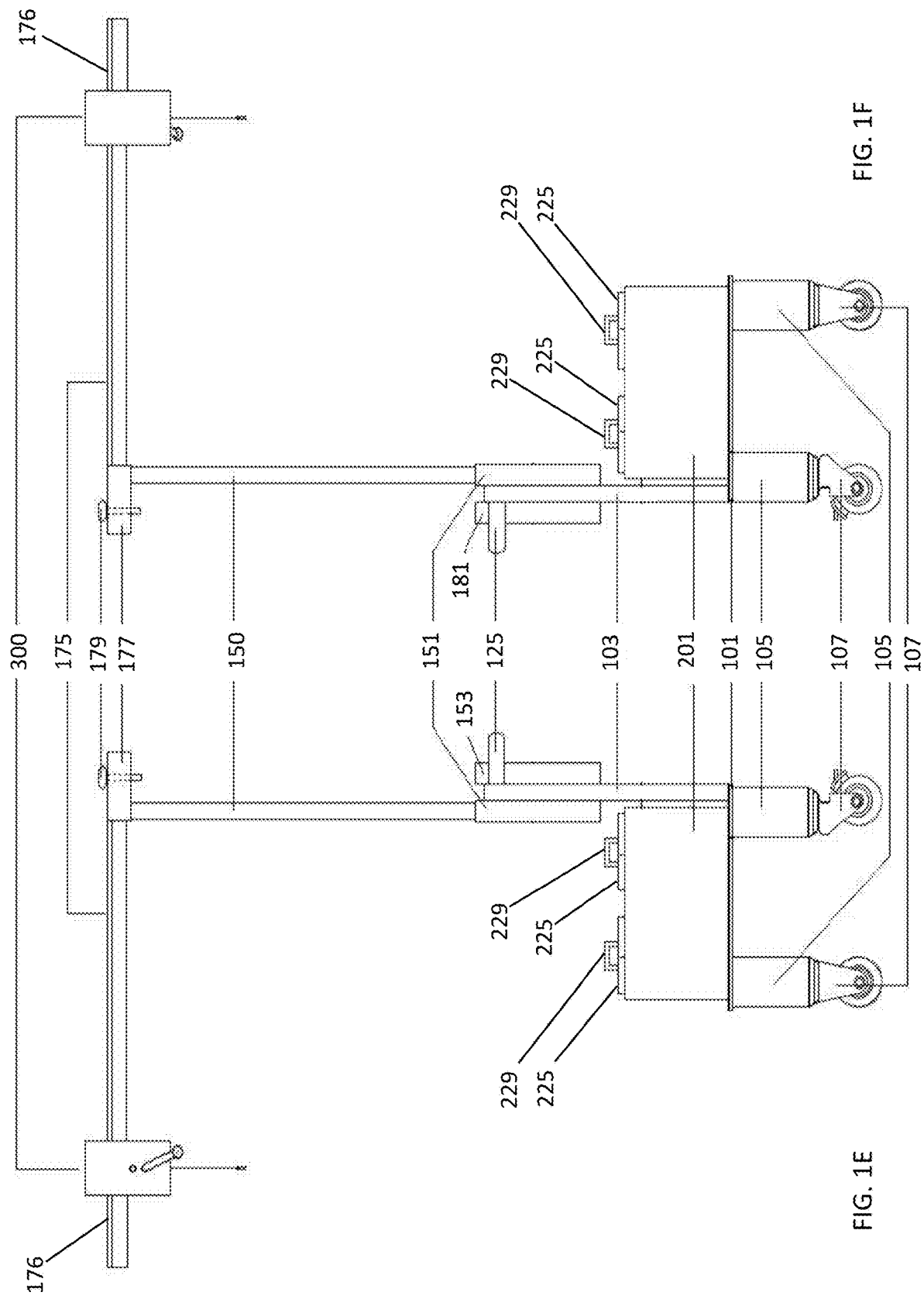

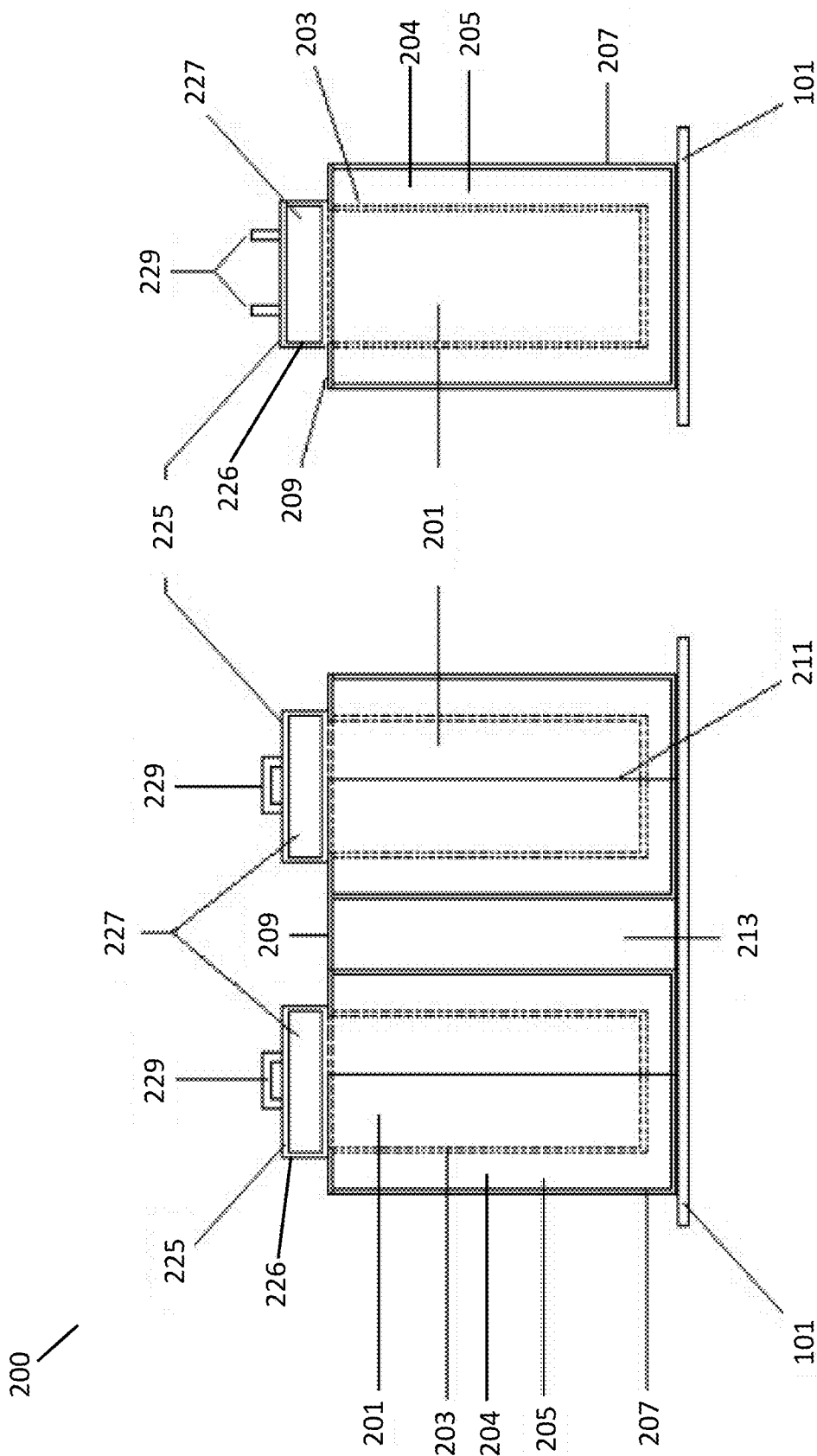

Table 1: 13 Most Commonly used Isotopes in Radiopharmaceuticals.

| Isotope | Gamma/X-Ray keV | % Abundance | Beta keV | % Abundance | Alpha keV | % Abundance | Accessible dose rate background | Storage Shielding Gamma X-Ray Dose Rate Reduction 90% | Storage Shielding Beta Dose Rate Reduction 100% | Storage Shielding Required for Alpha |
|---|---|---|---|---|---|---|---|---|---|---|
| Cesium-137 | 662 | 85 | 174 | 94 | N/A | N/A | <2 mR/hr | 22 mm Pb | 4 mm Plastic | N/A |
|  | 32 | 6 | 624 | 6 |  |  |  |  |  |  |
|  |  |  | 426 | 6 |  |  |  |  |  |  |
|  |  |  | 656 | 1 |  |  |  |  |  |  |
| Chromium-51 | 320 | 98 | N/A | N/A | N/A | N/A | <2 mR/hr | 15 mm Pb | N/A | N/A |
| Copper-64 | 1346 | 26 | 190 | 39 | N/A | N/A | <2 mR/hr | 16 mm Pb | 2 mm Plastic | N/A |
|  | 511 | 35 | 278(+) | 17 |  |  |  |  |  |  |
| Fluorine-18 | 511 | 194 | 250(+) | 97 | N/A | N/A | <2 mR/hr | 15 mm Pb | 2 mm Plastic | N/A |
| Iodine-123 | 159 | 83 | 127 | 14 | N/A | N/A | <2 mR/hr | 12 mm Pb | 3 mm Plastic | N/A |
|  | 27 | 72 | 23 | 9 |  |  |  |  |  |  |
|  | 31 | 16 | 27 | 4 |  |  |  |  |  |  |
|  | 529 | 2 | 154 | 3 |  |  |  |  |  |  |
| Iodine-131 | 364 | 82 | 192 | 90 | N/A | N/A | <2 mR/hr | 10 mm Pb | 10 mm Plastic | N/A |
|  | 637 | 7 | 97 | 7 |  |  |  |  |  |  |
|  | 284 | 6 | 48 | 4 |  |  |  |  |  |  |
|  | 80 | 3 | 69 | 2 |  |  |  |  |  |  |
| Molybdenum-99 | 141 | 89 | 443 | 82 | N/A | N/A | <3 mR/hr | 20 mm Pb | 4 mm plastic | N/A |
|  | 740 | 12 | 133 | 16 |  |  |  |  |  |  |
|  | 181 | 6 | 119 | 9 |  |  |  |  |  |  |
|  | 18 | 6 | 20 | 4 |  |  |  |  |  |  |
| Selenium-75 | 265 | 59 | 10 | 9 | N/A | N/A | <2 mR/hr | 14 mm Pb | 0.3 mm Plastic | N/A |
|  | 136 | 58 | 13 | 5 |  |  |  |  |  |  |
|  | 11 | 58 | 65 | 3 |  |  |  |  |  |  |
|  | 280 | 25 | 134 | 2 |  |  |  |  |  |  |
| Sodium-22 | 511 | 180 | 215(+) | 90 | N/A | N/A | <2 mR/hr | 36 mm Pb | 1.4 mm Plastic | N/A |
|  | 1275 | 100 |  |  |  |  |  |  |  |  |
| Strontium-89 | N/A | N/A | 585 | 100 | N/A | N/A | <2 mR/hr | N/A | 5.3 mm Plastic | N/A |
| Technetium-99m | 141 | 89 | 119 | 9 | N/A | N/A | <2 mR/hr | 0.9 mm Pb | 0.3 mm plastic | N/A |
|  | 18 | 6 | 15 | 2 |  |  |  |  |  |  |
|  |  |  | 137 | 1 |  |  |  |  |  |  |
| Thallium-201 | 71 | 46 | 84 | 16 | N/A | N/A | <2 mR/hr | 0.9 mm Pb | 0.3 Plastic | N/A |
|  | 69 | 27 | 16 | 6 |  |  |  |  |  |  |
|  | 12 | 11 | 17 | 6 |  |  |  |  |  |  |
|  | 167 | 10 | 52 | 7 |  |  |  |  |  |  |
| Xenon-133 | 81 | 38 | 101 | 99 | N/A | N/A | <2 mR/hr | 0.4 mm Pb | 0.8 mm Plastic | N/A |
|  | 31 | 41 | 45 | 55 |  |  |  |  |  |  |
|  | 35 | 6 | 75 | 7 |  |  |  |  |  |  |
|  | 35 | 1 | 25 | 4 |  |  |  |  |  |  |

FIG. 4

SHIELDED LIFT AND TRANSPORT DEVICES FOR RADIOACTIVE PAYLOADS

BACKGROUND

Like most commercial products, following delivery at a facility, radioactive payloads such as radiopharmaceutical elution generators must be unloaded from shipping packaging and transported to a storage or use location (e.g., a cabinet, storage well, table, etc. of a cleanroom or lab) within a radiopharmaceutical facility. Existing processes for such transport of radioactive payloads generally include nothing more than manually removing the (usually heavy) radioactive payloads from the shipping packaging (e.g., a box, crate, case, pallet, or other such packaging), placing them on a cart, and wheeling the cart into the radiopharmaceutical facility where the radioactive payloads must then be manually removed from the cart and placed into the storage or use location. The carts used in such processes are surprisingly simplistic and lacking in radiation-mitigating features, often they are basic carts used in everyday commercial settings and are made of wire or flat plastic or metal without any form of shielding. In practice, such setups suffer from a number of hygienic, radiation exposure, and other employee health and safety concerns.

With respect to sanitation and cleanroom hygiene, carts currently in use for such transport often include many right angles, small, unsealed joints and seams, small cavities, or other structural features which are difficult or impossible to clean and sanitize but in which it is also easy for water and contaminants such as bacteria, viruses, environmental chemicals, etc. to collect. Such structures increase the potential for contact and/or airborne contamination of the radioactive payloads themselves and/or the cleanroom into which the cart is ultimately transported, thereby causing contamination and health hazards.

With respect to radiation exposure, such carts typically do not include any radiation shielding of any kind. Radioactive payloads such as radiopharmaceutical elution generators sometimes include a nominal amount of shielding within their own packaging but such shielding is significantly less than necessary for safe storage and handling. Thus, staff engaging in such transport processes can be exposed to entirely unshielded and/or under-shielded radioactive materials throughout the process. Although each transport activity is typically undertaken over a relatively short period of time, negative health impacts from radiation exposure can result from an accumulation of relatively short doses. Accordingly, current processes do not provide staff with sufficient radiation safety.

Furthermore, in part because of the nominal shielding mentioned above, such radioactive payloads are usually heavy and may have toxic materials such as lead packaged therewith. The manual removal and placement in storage or use locations of such materials, particularly when those tasks are repetitive in nature, presents many employee health and safety risks, including those physical risks typically associated with the handling of heavy and/or toxic objects. Such risks include pinch hazards, muscle strains, crush events, and exposure to lead.

SUMMARY

Shielded lift and transport devices for radioactive payloads are described herein. Each device includes a wheeled base having a platform, shielding assembly having a hollow shield casing and two wells positioned therein, and lids for covering each well. Radiation shielding material is provided along the bottom and sides of each well and in each lid. In addition, all radiation shielding material is fully enclosed within a non-toxic, hermetically sealed casing. Each device also includes a mast extending upward from the wheeled base, a boom extending horizontally from the mast, and a lift repositionable along the boom and configured to lift radioactive payloads out of (and lower radioactive payloads into) the wells and/or shipping packaging. The mast, boom, and lift can each be removable and/or collapsible when not in use to provide a smaller form factor of the device to facilitate indoor navigation and space-efficient storage when not in use.

In one aspect, a radioactive lift transport cart is provided. The radioactive lift transport cart includes a wheeled base having a platform. The radioactive lift transport cart also includes a shielding assembly positioned on an upper surface of the platform. The shielding assembly includes a shield casing having an interior cavity. The shielding assembly also includes a first well positioned within the interior cavity and including a first well casing having a first well casing bottom and a first well casing side defining a first well cavity and a first well opening sized to receive a first radioactive payload. The shielding assembly also includes a second well positioned within the interior cavity and including a second well casing having a second well casing bottom and a second well casing side defining a second well cavity and second well opening sized to receive a second radioactive payload. The shielding assembly also includes the shield casing having a shield casing bottom and a shield casing side extending around and spaced apart from the first and second well casing bottoms and the first and second well casing sides to form one or more shielding cavities between the shield casing and the first and second well casings. The shielding assembly also includes radiation shielding material filling the one or more shielding cavities to surround the first and second well casing sides and first and second well casing bottoms. The radioactive lift transport cart also includes a mast extending upward from the wheeled base. The radioactive lift transport cart also includes a boom extending outward from the mast to form a cantilever. The radioactive lift transport cart also includes a lift repositionable along the boom and configured to lift the first radioactive payload out of the first well and/or the second radioactive payload out of the second well.

In some embodiments, the radioactive lift transport cart also includes a lift support frame fixed to the wheeled base. In some embodiments, the mast is removably attachable to the lift support frame. In some embodiments, the lift support frame includes a vertical sleeve sized to receive the mast therein. In some embodiments, the boom includes an attachment base for attachment to the mast. In some embodiments, the radioactive lift transport cart also includes a key protruding from the boom perpendicular to a longitudinal axis of the boom and extending along at least a portion of a length of the boom. In some embodiments, the lift also includes a lift case having opposing apertures sized to permit the boom to pass therethrough. In some embodiments, the lift also includes a key cam positioned in the lift case and sized to receive the key of the boom to permit sliding of the lift along the boom while preventing rotational movement of the lift around the boom. In some embodiments, the lift further also includes at least one boom cam positioned in the lift case for guiding the boom therethrough. In some embodiments, the lift also includes a lifting mechanism. In some embodiments, the lift also includes a lifting line having a working end deployable to a deployed position and retractable to a retracted position by the lifting mechanism. In some embodiments, the lift also includes at least one of a hook, clip, magnet, or combinations thereof attached to the working end of the lifting line and configured for attachment to at least one of the first or second radioactive payloads. In some embodiments, in the retracted position, the lifting line is at least partially wound around a spool of the lifting mechanism. In some embodiments, the lifting line is at least one of a cable, a wire, a chain, a rope, or combinations thereof.

In some embodiments, the lifting mechanism is at least one of a hand crank, a winch, or a combination thereof. In some embodiments, the lifting mechanism is a locking hand crank including a crank. In some embodiments, the crank includes a handle portion positioned outside of the lift case. In some embodiments, the crank includes a crank shaft extending through the lift case and rotatable within the lift case. In some embodiments, the crank includes spool attached to the crank shaft and configured to wind and unwind the lifting line. In some embodiments, the crank includes a spool plate having a plurality of locking holes defined around a circumference thereof. In some embodiments, the crank includes locking pin mounted through the lift case and positioned to selectively extend into a circumferentiallly aligned one of the plurality of locking holes. In some embodiments, the locking hand crank also includes a tension spring biased to extend the locking pin into the circumferentiallly aligned one of the plurality of locking holes. In some embodiments, the radioactive lift transport cart also includes a first lid sized to cover the first well opening. In some embodiments, the radioactive lift transport cart also includes a second lid sized to cover the second well opening. In some embodiments, each of the first and second lids including a lid casing have lid radiation shielding material disposed therein. In some embodiments, the wheeled base includes one or more legs extending downward from a lower surface of the platform and each having a caster. In some embodiments, the radiation shielding material filling the shielding cavity is at least one of lead or tungsten. In some embodiments, a thickness of the radiation shielding material filling the shielding cavity surrounding the first and second well casing sides and first and second well casing bottoms meets legal and/or industry standard shielding requirements for an isotope to be transported. In some embodiments, the radiation shielding material filling the shielding cavity surrounding the first and second well casing sides and first and second well casing bottoms is between 6 mm to 50.8 mm. In some embodiments, the first and second well casings, and the shield casing are each constructed of at least one of iron, steel, stainless steel, tungsten, aluminum, metal alloys, composite materials, or combinations thereof. In some embodiments, a shape of each of the first and second well openings is one or more of circular, square, rectangular, rhombic, pentagonal, hexagonal, pentangular, star-shaped, polygonal, triangular, or combinations thereof. In some embodiments, one or more of the first and second radioactive payloads is a radiopharmaceutical elution generator.

BRIEF DESCRIPTION OF THE DRAWINGS

FIG. 1A illustrates a top view of a shielded lift and transport device for radioactive payloads in accordance with various embodiments.

FIG. 1B illustrates a bottom view of the shielded lift and transport device of FIG. 1A.

FIG. 1C illustrates a front view of the shielded lift and transport device of FIG. 1A.

FIG. 1D illustrates a back view of the shielded lift and transport device of FIG. 1A.

FIG. 1E illustrates a right view of the shielded lift and transport device of FIG. 1A.

FIG. 1F illustrates a left view of the shielded lift and transport device of FIG. 1A.

FIG. 2B illustrates a side cross-section of the shielding assembly of FIG. 2A.

FIG. 2C illustrates a side cross-section of a single well of the shielding assembly of FIG. 2A.

FIG. 4 illustrates a table of commonly used radiopharmaceutical isotopes and corresponding shielding types and thicknesses.

DETAILED DESCRIPTION

Figure 2A:
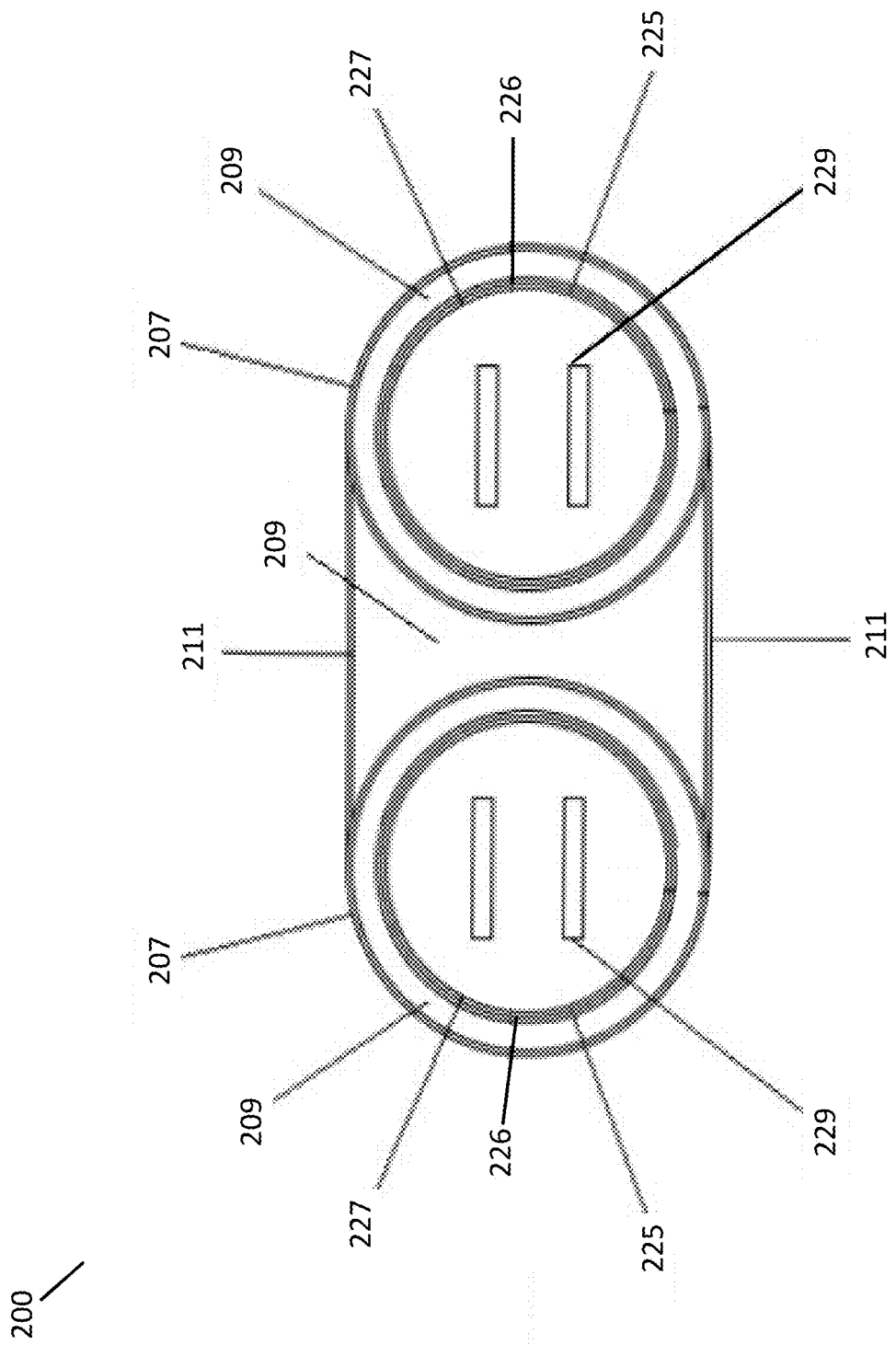
FIG. 2A illustrates a top view of a shielding assembly of a shielded lift and transport device in accordance with various embodiments.

Provided herein are shielded lift and transport devices for radioactive payloads are described herein. Each device includes a wheeled base having a platform, shielding assembly having a hollow shield casing and two wells positioned therein, and lids for covering each well. Radiation shielding material (e.g., lead or tungsten) is provided along the bottom and sides of each well and in each lid. In addition, all radiation shielding material is fully enclosed within a non-toxic, hermetically sealed casing. Each device also includes a mast extending upward from the wheeled base, a boom extending horizontally from the mast, and a lift repositionable along the boom and configured to lift radioactive payloads out of (and lower radioactive payloads into) the wells and/or the shipping packaging. The mast, boom, and lift can each be removable and/or collapsible when not in use to provide a smaller form factor of the device to facilitate indoor navigation and space-efficient storage when not in use. Although illustrated and described herein in the context of radiopharmaceutical elution generator lifting and transport, the shielded lift and transport devices described herein can be used in connection with the lifting and transport of any radioactive material, including, for example, generators, contaminated tools or other objects, testing materials for medical, academic, government, agricultural, and/or private use (e.g., for experimentation, commercial, or other use), nuclear fuel and/or waste, or combinations thereof.

In the context of radiopharmaceutical elution generator lifting and transport, the shielded lift and transport devices described herein advantageously provide a safer and more efficient way of lifting and transporting radioactive payloads. In particular, because each well is surrounded by radiation shielding, radiation exposure is minimized. In addition, because the radiation shielding material is fully enclosed by a non-toxic, hermetically sealed casing, health and safety concerns surrounding lead exposure are eliminated. Furthermore, because the wells include a continuous, smooth surface and do not need to be moved for cleaning, the likelihood of proper cleaning is increased. The shielded lift and transport devices also mitigate employee health and safety concerns by eliminating the need for repetitive lifting, moving, and handling of heavy radioactive payloads associated with the conventional steps of unloading the shipping packaging, loading the cart, unloading the cart, and placement in a storage or use location.

Instead, during removal from the shipping packaging and loading into the shielded lift and transport device, the mast, boom, and lift are configured such that the boom and lift can extend beyond a wheeled base of the shielded lift and transport device over the shipping packaging for lifting of the radioactive payload and then the lift can be repositioned along the boom for lowering the radioactive payload into one of the wells of the shielding assembly. Similarly, during unloading from the shielded lift and transport device and loading into the storage or use location (e.g., a cabinet, storage well, table, etc. of a cleanroom or lab) within the radiopharmaceutical facility, the mast, boom, and lift provide for lifting the radioactive payload out of the well of the shielding assembly, extension of the boom and lift into or above the storage or use location, and repositioning of the lift along the boom for lowering the radioactive payload onto/into the storage or use location.

Referring now to FIGS. 1A-1F, a shielded lift and transport device 10 includes a wheeled base 100 having a platform 101, a lift support frame 103 extending from an upper surface of the platform 101, and a plurality of legs 105 extending from a lower surface of the platform 101, each leg 105 having a caster 107 or other wheeled or movable element at an end thereof for facilitating movement of the device 10.

The platform 101 can preferably be substantially planar along an upper surface thereof and can be constructed from, for example, stainless steel, aluminum, tungsten, other metals, composites, plastics, combinations thereof, or any other suitable material capable of supporting a weight of the device 10, including a shielding assembly 200 partially filled with heavy radiation shielding material 205 (see FIGS. 2A-2C), and any payload intended to be transported therein. The platform 101, although shown as being a "T"-shaped plate, in some embodiments the platform 101 can be formed in any suitable shape including, for example, rectangular, circular, elliptical, square, rhomboid, any other polygonal shape, any irregular shape, or combinations thereof. In addition, although shown and described herein as being a flat plate, the platform 101 in some embodiments, can include an enclosed or partially enclosed hollow body and/or an open frame.

Referring now to FIGS. 2A-2C, a shielding assembly 200 can be mounted to the wheeled base 100 on the upper surface of the platform 101. The shielding assembly 200 can include one or more shield casings 207, each having a closed bottom and at least one side defining an interior cavity 204 and enclosed by an upper shield casing 209. Each shield casing 207 and upper shield casing 209 (and, if provided, each bridging shield 211) can preferably be constructed from, for example, stainless steel, aluminum, tungsten, other metals, composites, plastics, combinations thereof, or any other suitable material. Each shield casing 207, although shown as having cylindrical shape herein, can take any other suitable shape including, for example, a rectangular prism or box shape, an egg shape, an elliptical prism, or any other suitable shape.

Within each inner cavity 204, the shielding assembly 200 includes one or more well casings 203 positioned in the interior cavity 204 (e.g., one per inner cavity 204 as shown), each well casing 203 having a closed bottom and at least one side. The well casing 203 forms a well cavity 201 having an opening defined as an aperture in the upper shield casing 209, to which the open end of the well casing 203 is attached. The well cavity 201 and opening can be sized and shaped to receive and accommodate a relevant radioactive payload or payloads. For example, in some embodiments, each of the well cavity openings can be one or more of circular, square, rectangular, rhombic, pentagonal, hexagonal, pentangular, star-shaped, polygonal, triangular, or combinations thereof and similarly, each well cavity 201 and corresponding well casing 203 can have any suitable shape, whether having a constant or variable cross-sectional geometry throughout a depth thereof. The well casing 203 can be constructed from, for example, stainless steel, aluminum, tungsten, other metals, composites, plastics, combinations thereof, or any other suitable material.

In general, the shield casing 207 extends around and is spaced apart from the one or more of the well casings 203 to form a shielding cavity therebetween (i.e., the portion of each inner cavity 204 not occupied by the one or more well casing(s) 203 and well cavity 201 formed therein). Depending on the intended application, the shielding cavity (the non-well portion of inner cavity 204) can be filled with any suitable and effective radiation shielding material 205 such as lead, tungsten, high density concrete, borated polyethylene, metal impregnated polymers, aluminum, or any other suitable materials. The thickness of the radiation shielding material 205 can be configured with any suitable thickness depending on the type and size of a radioactive payload to be stored in the well cavities 201. Types and thicknesses of radiation shielding material 205 for common radiopharmaceutical isotopes are shown in FIG. 4 and, in some embodiments, the shielding cavity can be sized to accommodate radiation shielding material 205 matching or exceeding any one or more such thicknesses. In some embodiments, the radiation shielding material 205 can be between about 6 mm to about 50.8 mm thick surrounding each well casing 203 in all directions, although each well cavity opening is removably shielded by a corresponding lid 225 as discussed below.

In the exemplary embodiment illustrated in FIGS. 2A-2C, a dual well configuration is used having multiple, two separate shield casings 207 spaced apart on the platform 101 to define two separate inner cavities 204. In such embodiments, one or more bridging casings 211 can be included and also enclosed by the upper shield casing 209, thus forming one or more sealed, non-payload cavities 213. Alternatively, in some embodiments, each individual shield casing 207 can be enclosed with its own, individual upper shield casing 209 and the intervening space left open.

In an alternative embodiment (not shown), a single, shield casing can be provided surrounding adjacently positioned first and second well casings forming adjacent first and second well cavities. Such a dual well configuration permits the first and second well cavities and their corresponding first and second well casings to share shielding material along adjacent portions thereof within a single shielding cavity. Thus, such dual well configurations can advantageously use less shielding material along those adjacent portions (a single shielding thickness shared by both wells, rather than two separate shielding segments each having the same thickness), thereby reducing space/size, weight, material usage, and construction costs. Thus, the shielded lift and transport device 10 is lighter and less expensive than conventional solutions. Furthermore, by reducing the size of the device 10, the device 10 becomes more maneuverable during transport and storage of the device 10 within radiopharmaceutical facilities is made more convenient. This can be a significant advantage in such facilities, which are typically cramped and space limited.

The openings of the well cavity 201 are removably shielded by lids 225 to permit insertion, extraction, and/or use of the radioactive payload to be or being transported in the respective well cavity 201. Referring now to FIGS. 2A-2C, lids 225 are sized and shaped to at least cover the openings of the well cavity 201 and, preferably, to be larger than the opening to overlap the upper shield casing 209. The lids 225 include a sealed lid casing 226 defining a lid cavity at least partially filled with lid shielding material 227. The thickness of the radiation shielding material 227 can be configured to have any suitable thickness depending on the type and size of a radioactive payload to be stored in the well cavities 201. Types and thicknesses of radiation shielding material 227 for common radiopharmaceutical isotopes are shown in FIG. 4 and, in some embodiments, the lid cavity can be sized to accommodate radiation shielding material 227 matching or exceeding any one or more such thicknesses. In some embodiments, the radiation shielding material 227 can be between about 6 mm to about 50.8 mm thick covering the opening of the well cavity 201.

The lid casing 226 can be constructed from any suitable material including, for example, stainless steel, aluminum, tungsten, other metals, composites, plastics, combinations thereof, or any other suitable material. The lid shielding material 227 can be any suitable and effective radiation shielding material 227 such as lead, tungsten, high density concrete, borated polyethylene, metal impregnated polymers, aluminum, or any other suitable materials.

In some embodiments, to facilitate carrying and lifting of the lid 225, the lid 225 can also include a handle 229 extending from the lid casing 226 opposite the well cavity 201. In addition, as shown in FIGS. 2A-2C, in some embodiments the lid 225 can be provided with dual, substantially flat handles 229. This configuration serves a dual advantageous purpose of promoting proper lifting of heavy objects with two hands while providing a safe place to stack lids when lifting radioactive payloads out of the wells 201 and/or lowering the radioactive payloads into the wells 201.

Referring again to FIGS. 1A-1F, the support frame 103 extends from the upper surface of the platform 101 and can generally be constructed of one or more vertical 102 and/or horizontal 104 structural members 205. The structural members 102, 104 can be constructed from any material possessing the stiffness and strength required to withstand forces applied during lifting and transport without structural failure.

In some embodiments, a handle 125 can be attached to the support frame (e.g., at one or more of the structural members 102, 104) to facilitate easier movement and steering of the cart. Although shown as a fixed handle herein, in some embodiments, the handle 125 can be removable and/or hinged. Such removable and/or hinged configurations may advantageously provide for movement and steering control and yet still occupy less floor space in facilities where storage space is limited.

In some embodiments, the device 10 may include mast storage 153 and/or boom storage 181 for storing a mast 150 and a boom 175, respectively, when those components are disassembled (e.g., for compact storage and/or for transport through portions of an indoor facility wherein passageways are too narrow and/or ceilings are too low to accommodate the assembled device 10. As shown in FIGS. 1A-1F, such mast storage 153 and boom storage 181 can be attached to the support frame 103. Although each of the mast storage 153 and boom storage 181 is shown herein as being, essentially, a sleeve having a closed bottom, any suitable storage mechanism or design can be used in accordance with various embodiments.

The device 10 also includes a mast base 151 affixable to the support frame 103 and/or the platform. The mast base 151 defines an interior cavity sized and shaped for receiving a lower end of a removable mast 150 therein such that, when installed in the mast base 151, the mast 150 extends substantially vertically upward from the wheeled base 100. The mast 150 and/or the mast base 151, in accordance with various embodiments, can be constructed from, for example, stainless steel, aluminum, other metals, composites, plastics, combinations thereof, or any other suitable material capable of withstanding forces applied during lifting and transport.

The device 10 also includes a boom base 177 attachable to the mast 150 at a height along a length of the mast 150 (e.g., at an upper end of the mast 150 as shown). The boom base 177 can define an interior cavity sized and shaped for receiving a first end of a boom 175 therein such that, when installed in the boom base 177, the boom 175 extends outward from the mast 150 to form a cantilever. In some embodiments, the boom 175 can extend above and substantially parallel to the platform 101 and can preferably extend beyond the platform 101 to facilitate positioning of the boom 175 over a shipping packaging (e.g., a box, crate, case, pallet, or other such packaging) containing the radioactive payload while the wheeled base 100 remains on the ground, loading dock, warehouse floor, or other surface exterior to the shipping packaging.

Each of the boom 175 and boom base 177, in accordance with various embodiments, can be constructed from, for example, stainless steel, aluminum, other metals, composites, plastics, combinations thereof, or any other suitable material capable of withstanding forces applied during lifting and transport.

The boom 175, in some embodiments, can be removably secured to the boom base 177 and/or the mast 150 via one or more boom pins 179 extending through the boom 175 and the boom base 177, or by any other suitable mechanism for removably securing the boom 175 within the boom base 177. Alternatively, in some embodiments, the boom base 177 can be integrally formed as part of the boom 175, in which case the boom base 177 would need only to be secured to the mast 150.

A cross-sectional size and shape of the boom 175, in some embodiments, can be configured to pass through a lift 300 such that the lift 300 can slide or otherwise move along a length of the boom 175. In some embodiments, to prevent rotation of the lift 300 about the boom 175 and to ensure proper orientation and alignment of the lift 300, the boom 175 can include a key 176 protruding outward perpendicular to a longitudinal axis of the boom 175 and extending along at least a portion of the length of the boom 175. For example, as shown in FIGS. 1E-1F, the key 176 can extend along a top of the boom 175 along its entire length.

The lift 300, in accordance with various embodiments, can include any suitable hand crank, winch, other lifting mechanism, or combinations thereof capable of deploying and retracting a lifting line 377. The lifting line 377 can include any one of a cable, a wire, a chain, a rope, or combinations thereof. In some embodiments, an attachment mechanism 375 can be provided for attaching a working end of the lifting line 377 to a payload to be lifted. In some embodiments, the attachment mechanism can include at least one of a hook, clip, magnet, or combinations thereof attached to the working end of the lifting line and configured for attachment to a radioactive payload.

Figure 3A:
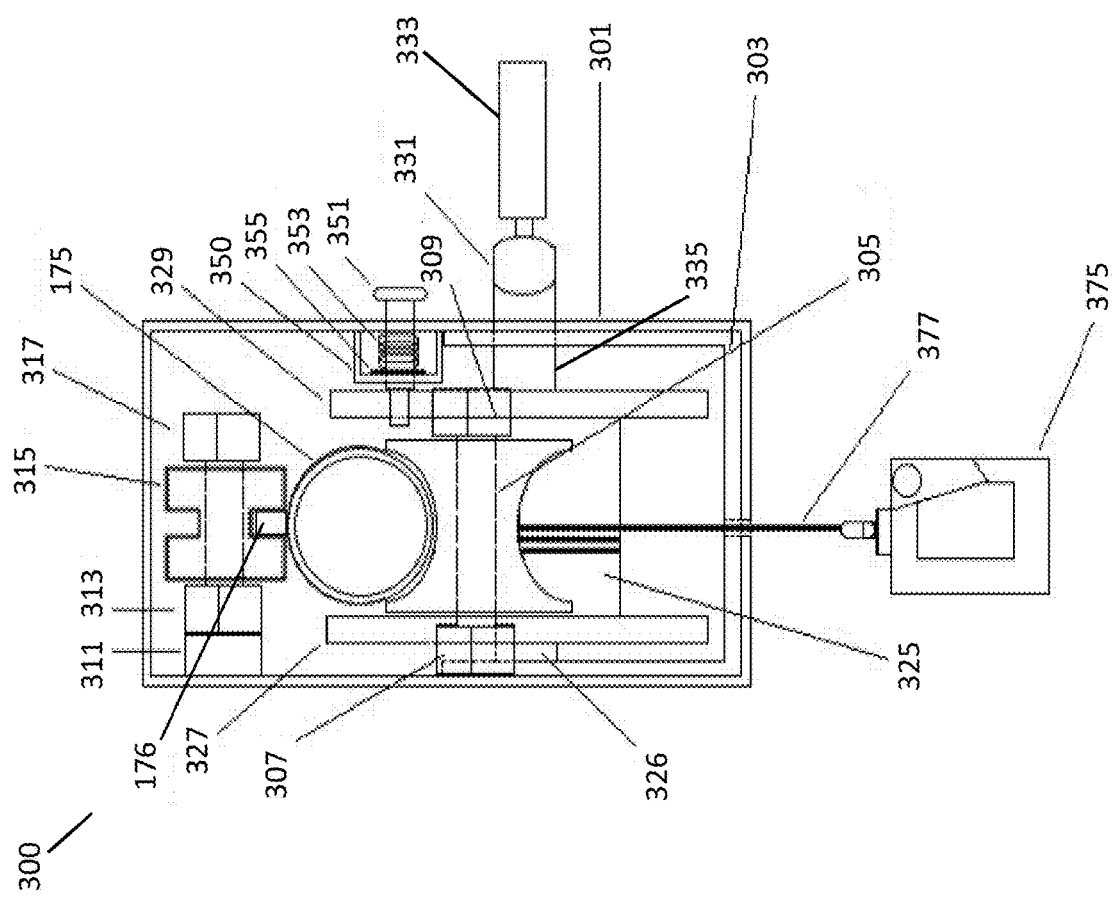
FIG. 3A illustrates a left cross-section of a lift of a shielded lift and transport device in accordance with various embodiments.
Figure 3B:
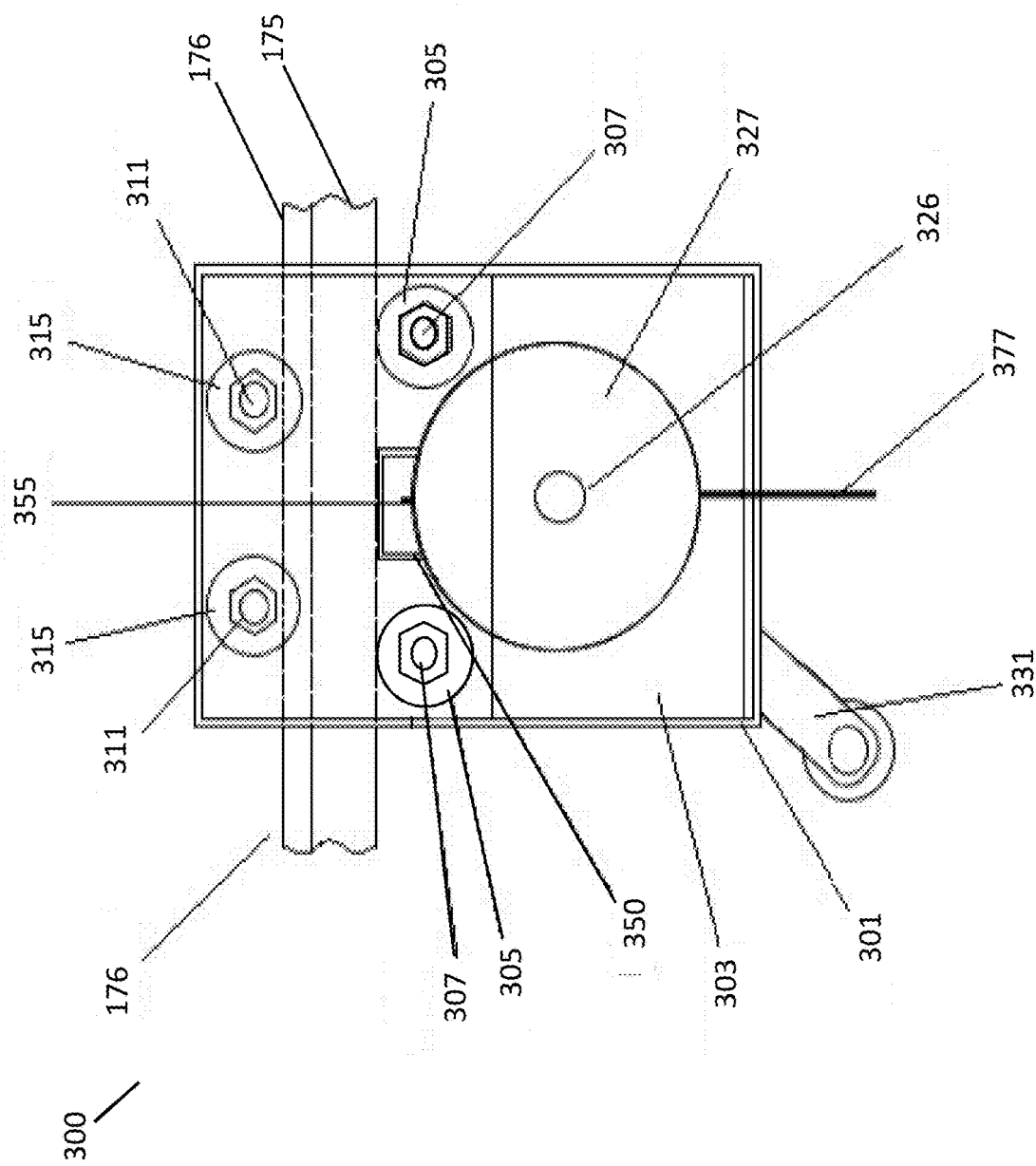
FIG. 3B illustrates a back cross-section of the lift of FIG. 3A.
Figure 3C:
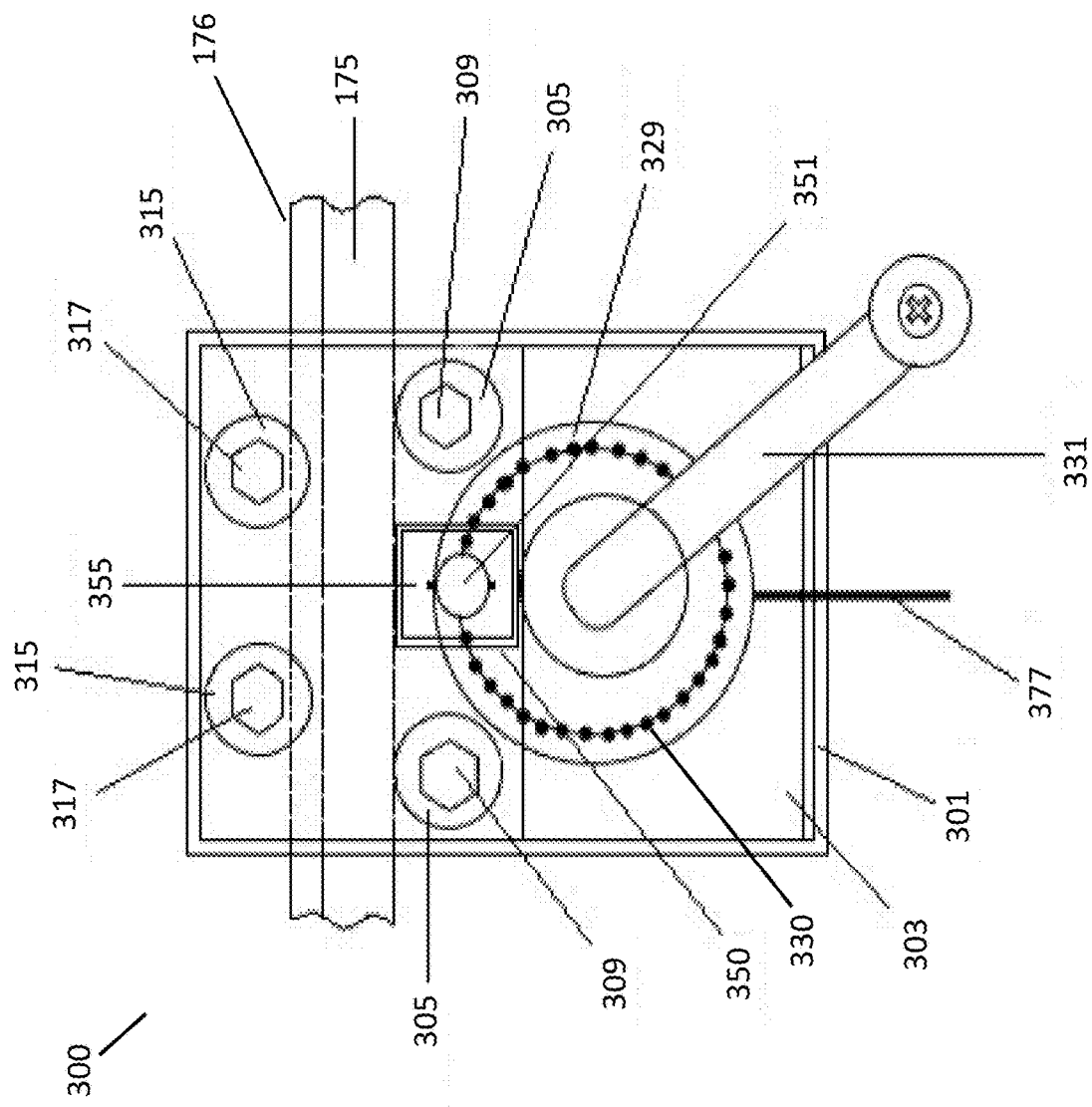
FIG. 3C illustrates a front cross-section of the lift of FIG. 3A.

An exemplary, locking, hand cranked lift 300 is shown in FIGS. 3A-3C. The lift 300 includes a lift case 301 having opposing apertures sized to permit the boom to pass therethrough. The lift case 301 can be constructed from, for example, stainless steel, aluminum, tungsten, other metals, composites, plastics, combinations thereof, or any other suitable material. Within the lift case 301, the lift 300 includes a key cam 315 positioned and sized to receive the key 176 of the boom 175 to permit sliding of the lift 300 along the boom while preventing rotational movement of the lift 300 around the boom 175. The key cam 315 can be secured within the case, for example, via bolt 317 and nut 313 and can be positioned within the case by spacer 311. The lift 300 also includes a boom cam 305 positioned in the lift case 301 for guiding the boom 175 therethrough. The boom cam 305 can be secured within the lift case 301, for example, via bolt 309 and nut 307.

As shown herein, the lifting functionality of the lift 300 can be provided by a locking spool 325 around which at least a portion of the lifting line 377 is wound in the retracted position of the lift 300. The spool 325 includes a backplate 327 and a locking frontplate 329 for retaining the lifting line 377 on the spool 325 during deployment and retraction. The spool 325 can be secured within the lift case 301 by a spool shaft 326 about which the spool 325 can rotate. In some embodiments, the spool 325 can be provided with additional structural support by a retainer housing 303 positioned within the lift case 301.

As shown in FIGS. 3A-3C, in some embodiments, the spool 325 can be deployed or retracted via a hand crank 331 rotatably engaged therewith. The hand crank 331 can include a handle portion 333 positioned outside of the lift case, and a crank shaft 335 extending through the lift case 301 and rotatable within the lift case. However, although shown herein as including a hand crank 331, it will be apparent in view of this disclosure that, in some embodiments, the spool 325 can instead be deployed or retracted by a winch or any other suitable mechanism, whether manual or powered.

In some embodiments, in order to prevent an unsafe rapid, free-release deployment of the lifting line 377 (and any payload attached thereto), the lift 300 can include one or more locking mechanisms. For example, as shown in FIGS. 3A-3C, the frontplate 329 can include a plurality of locking holes 330 positioned around a circumference thereof and sized to receive a locking pin 351 therein. The locking pin 351 can extend through a side of the lift case 301 facing the faceplate 329 in alignment with the locking holes 330 such that, when the locking pin 351 is fully extended into the lift case 301, the locking pin 351 engages a co-located one of the locking holes 330 to arrest a rotational motion of the spool 325.

In some embodiments, the locking pin 351 can advantageously be spring biased toward a locked position to act as a so-called "dead man switch" to prevent rapid deployment in the event that an operator releases the hand crank 331 while still permitting selective deployment of the lifting line 377 by manual withdrawal of the locking pin 351 (e.g., by pulling) into an unlocked position. The spring biasing can be achieved, as shown, by the inclusion of a tension spring 353 within a retainer housing 350 positioned inside the lift case 301 between the side wall of the lift case 301 through which the locking pin 351 passes and the faceplate 329. The tension spring 353 can be secured to the retainer housing 350, for example, by a clip 355.

Referring again to the shielded lift and transport device 10 FIGS. 1A-1F, a lifting and transport process can include maneuvering, via the handle 125, the shielded lift and transport device 10 such that the wheeled base 100 and the shielding assembly 200 are adjacent to the shipping packaging and the boom 175 extends over the shipping packaging. The lift 300 can then be moved along the boom 175 until the lifting line 377 and the attachment mechanism 375 are positioned above a radioactive payload to be transported. The user can then attach the attachment mechanism 375 to the payload, use the crank 331 to lift the payload, and permit the locking pin 351 to engage the locking holes 330 to suspend the payload. The lift 300 can then be moved backward along the boom 175 until the payload is aligned with one of the wells 201. The user can then, again using the crank 331, lower the payload into the well 201, detach the attachment mechanism 375, retract the lifting line 377, and place a lid 225 over the corresponding well opening. The user can then proceed to transport the payload into the facility and reverse the process to unload the payload into the intended storage or use location (e.g., a cabinet, storage well, table, etc. of a cleanroom or lab).

Advantages of the Technology

As noted above, the shielded lift and transport devices described herein advantageously provide a safer and more efficient way of lifting and transporting radioactive payloads. In particular, because each well is surrounded by radiation shielding, radiation exposure is minimized. In addition, because the radiation shielding material is fully enclosed by a non-toxic, hermetically sealed casing, health and safety concerns surrounding lead exposure are eliminated. Furthermore, because the wells include a continuous, smooth surface and do not need to be moved for cleaning, the likelihood of proper cleaning is increased. The shielded lift and transport devices also mitigate employee health and safety concerns by eliminating the need for repetitive lifting, moving, and handling of heavy radioactive payloads associated with the conventional steps of unloading the shipping packaging, loading the cart, unloading the cart, and placement in a storage or use location.

Instead, during removal from shipping packaging and loading into the shielded lift and transport device, the mast, boom, and lift are configured such that the boom and lift can extend over the shipping packaging for lifting of the radioactive payload and then the lift can be repositioned along the boom for lowering the radioactive payload into one of the wells of the shielding assembly. Similarly, during unloading from the shielded lift and transport device and loading into the storage or use location (e.g., a cabinet, storage well, table, etc. of a cleanroom or lab) within the radiopharmaceutical facility, the mast, boom, and lift provide for lifting the radioactive payload out of the well of the shielding assembly, extension of the boom and lift into or above the storage or use location, and repositioning of the lift along the boom for lowering the radioactive payload onto/into the storage or use location.

Functional Benefits and Advantages

The two well design allows for payload swapping (e.g., between new and old radiopharmaceutical elution generators and, in combination with the well shielding, minimizes radiation exposure.
Each lid has two handles for proper lifting and provides a safe location to stack lids when lifting or lowering generators out of the wells.

The detachable lift system is designed with a sliding lift mechanism, making lifting, moving, and lowering of heavy generators in and out of wells easy while reducing the potential for injuries in the process.

The compact modular design of this cart is a space saving method of safely managing generators while reducing costly and damaging injuries and radiation exposures in even the most challenging of spaces.

Hygienic Benefits and Advantages

Hermetically sealed, fully encased construction provides an easy to clean unit surface reducing the potential of bacterial growth in cleanrooms.

Reduced Radiation Exposure Benefits and Advantages

Each well is surrounded on all sides by radiation shielding material, which prevents unnecessary radiation exposure while transporting radioactive payloads into clean rooms, during payload swapping, and while transporting used payloads out of the cleanroom or lab to final decay areas.

Space Saving Benefits and Advantages

The boom 175, mast 150, and lift are all detachable and storable onboard the device 10. Thus, along with a small, wheeled base 100 and shielding assembly 200 footprint the device 10 includes a space saving design capable of being deployed even in the most challenging of limited spaced environments.

While example embodiments have been particularly shown and described, it will be understood by those skilled in the art that various changes in form and details may be made therein without departing from the scope of the embodiments encompassed or contemplated herein.

As used herein, "consisting essentially of" allows the inclusion of materials or steps that do not materially affect the basic and novel characteristics of the claim. Any recitation herein of the term "comprising", particularly in a description of components of a composition or in a description of elements of a device, can be exchanged with "consisting essentially of" or "consisting of".

What is claimed is:

1. A radioactive lift transport cart comprising:
   a wheeled base having a platform;
   a shielding assembly positioned on an upper surface of the platform and including:
   a shield casing having an interior cavity;
   a first well positioned within the interior cavity and including a first well casing having a first well casing bottom and a first well casing side defining a first well cavity and a first well opening sized to receive a first radioactive payload;
   a second well positioned within the interior cavity and including a second well casing having a second well casing bottom and a second well casing side defining a second well cavity and second well opening sized to receive a second radioactive payload;
   the shield casing having a shield casing bottom and a shield casing side extending around and spaced apart from the first and second well casing bottoms and the first and second well casing sides to form one or more shielding cavities between the shield casing and the first and second well casings;
   radiation shielding material filling the one or more shielding cavities to surround the first and second well casing sides and first and second well casing bottoms;
   a mast extending upward from the wheeled base;
   a boom extending outward from the mast to form a cantilever; and
   a lift repositionable along the boom and configured to lift the first radioactive payload out of the first well and/or the second radioactive payload out of the second well.

2. The radioactive lift transport cart of claim 1, further comprising a lift support frame fixed to the wheeled base.

3. The radioactive lift transport cart of claim 2, wherein the mast is removably attachable to the lift support frame.

4. The radioactive lift transport cart of claim 3, wherein the lift support frame includes a vertical sleeve sized to receive the mast therein.

5. The radioactive lift transport cart of claim 1, wherein the boom includes an attachment base for attachment to the mast.

6. The radioactive lift transport cart of claim 1, further comprising a key protruding from the boom perpendicular to a longitudinal axis of the boom and extending along at least a portion of a length of the boom.

7. The radioactive lift transport cart of claim 6, wherein the lift further comprises:
   a lift case having opposing apertures sized to permit the boom to pass therethrough;
   a key cam positioned in the lift case and sized to receive the key of the boom to permit sliding of the lift along the boom while preventing rotational movement of the lift around the boom.

8. The radioactive lift transport cart of claim 7, wherein the lift further comprises at least one boom cam positioned in the lift case for guiding the boom therethrough.

9. The radioactive lift transport cart of claim 1, wherein the lift further comprises:
   a lifting mechanism; and
   a lifting line having a working end deployable to a deployed position and retractable to a retracted position by the lifting mechanism.

10. The radioactive lift transport cart of claim 9, wherein the lift further comprises at least one of a hook, clip, magnet, or combinations thereof attached to the working end of the lifting line and configured for attachment to at least one of the first and second radioactive payloads.

11. The radioactive lift transport cart of claim 9, wherein, in the retracted position, the lifting line is at least partially wound around a spool of the lifting mechanism.

12. The radioactive lift transport cart of claim 9, wherein the lifting line is at least one of a cable, a wire, a chain, a rope, or combinations thereof.

13. The radioactive lift transport cart of claim 9, wherein the lifting mechanism is at least one of a hand crank, a winch, or a combination thereof.

14. The radioactive lift transport cart of claim 13, wherein the lifting mechanism is a locking hand crank including:
   a crank having:
     a handle portion positioned outside of the lift case, and
     a crank shaft extending through the lift case and rotatable within the lift case;
   a spool attached to the crank shaft and configured to wind and unwind the lifting line;
   a spool plate having a plurality of locking holes defined around a circumference thereof; and a locking pin mounted through the lift case and positioned to selectively extend into a circumferentially aligned one of the plurality of locking holes.

15. The radioactive lift transport cart of claim 14, wherein the locking hand crank further comprises a tension spring biased to extend the locking pin into the circumferentially aligned one of the plurality of locking holes.

16. The radioactive lift transport cart of claim 1, further comprising:
   a first lid sized to cover the first well opening; and
   a second lid sized to cover the second well opening.

17. The radioactive lift transport cart of claim 16, each of the first and second lids including a lid casing having lid radiation shielding material disposed therein.

18. The radioactive lift transport cart of claim 1, wherein the wheeled base includes one or more legs extending downward from a lower surface of the platform and each having a caster.

19. The radioactive lift transport cart of claim 1, wherein the radiation shielding material filling the shielding cavity is at least one of lead or tungsten.

20. The radioactive lift transport cart of claim 1, wherein a thickness of the radiation shielding material filling the shielding cavity surrounding the first and second well casing sides and first and second well casing bottoms meets legal and/or industry standard shielding requirements for an isotope to be transported.

21. The radioactive lift transport cart of claim 20, wherein the radiation shielding material filling the shielding cavity surrounding the first and second well casing sides and first and second well casing bottoms is between 6 mm to 50.8 mm.

22. The radioactive lift transport cart of claim 1, wherein the first and second well casings, and the shield casing are each constructed of at least one of iron, steel, stainless steel, tungsten, aluminum, metal alloys, composite materials, or combinations thereof.

23. The radioactive lift transport cart of claim 1, wherein a shape of each of the first and second well openings is one or more of circular, square, rectangular, rhombic, pentagonal, hexagonal, pentangular, star-shaped, polygonal, triangular, or combinations thereof.

24. The radioactive lift transport cart of claim 1, wherein one or more of the first and second radioactive payloads is a radiopharmaceutical elution generator.

* * * * *